United States Patent [19]

Steinman

[11] Patent Number: 4,665,642

[45] Date of Patent: May 19, 1987

[54] FISHING LURE

[76] Inventor: Kenneth Steinman, 1901 W. Lafayette Blvd., Detroit, Mich. 48216

[21] Appl. No.: 648,305

[22] Filed: Sep. 7, 1984

[51] Int. Cl.⁴ .............................................. A01K 85/00
[52] U.S. Cl. ................................................... 43/42.52
[58] Field of Search ................... 43/42.39, 42.52, 42.4, 43/42.41, 42.26, 42.09, 42.10, 42.2, 42.3

[56] References Cited

U.S. PATENT DOCUMENTS

| | | | |
|---|---|---|---|
| 836,038 | 11/1906 | Hipp | 43/42.53 |
| 1,569,993 | 1/1926 | MacLead | 43/42.34 |
| 1,888,641 | 11/1932 | Toepper | 43/42.13 |
| 2,003,976 | 6/1935 | Raymond | 43/42.09 |
| 2,309,902 | 2/1943 | Harvey | 43/42.34 |
| 2,480,580 | 8/1949 | Hopkins | 43/42.34 |
| 2,586,186 | 2/1952 | Swanberg | 43/42.52 |
| 2,596,883 | 5/1952 | Wise | 43/42.33 |
| 2,619,764 | 12/1952 | Mellin | 43/42.13 |
| 2,629,961 | 3/1953 | Churchill | 43/42.52 |
| 2,726,472 | 12/1955 | Griffin | 43/42.34 |
| 4,429,482 | 2/1984 | Honse | 43/42.33 |
| 4,464,857 | 8/1984 | Olszewski | 43/42.33 |

FOREIGN PATENT DOCUMENTS

| | | | |
|---|---|---|---|
| 74953 | 4/1949 | Norway | 43/42.52 |
| 1379882 | 1/1975 | United Kingdom | 43/42.34 |

Primary Examiner—M. Jordan
Attorney, Agent, or Firm—Cullen, Sloman, Cantor, Grauer, Scott & Rutherford

[57] ABSTRACT

A spoon type fishing lure includes a body of fish shape lying in a first plane and having front and rear surfaces, and a barbed hook in a right angular plane, including a shank bearing against the rear surface, at one end secured thereto and intermediate its ends extending through one end of the body and terminating a reverse turned barb spaced from the rear surface. A weed deflector bar at one end is secured to the forward end of a lure body upon its rear surface with its other end aligned with and spaced from the barb. A peripheral flange on the body extends outwardly of the front surface and receives a paper strip which has a fish imprint thereon and is adhesively mounted upon lure body. A protective layer of transparent plastic material overlies the strip and extends to the flange. In a modified lure, the hook shank is retainingly nested in an elongated groove in the lure body and secured thereto.

2 Claims, 10 Drawing Figures

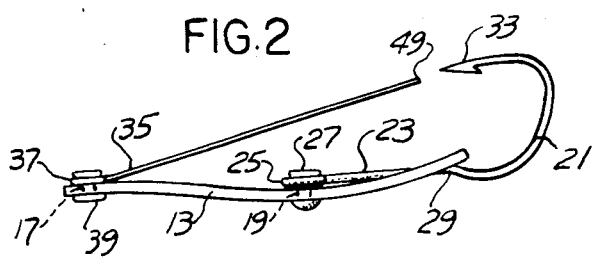
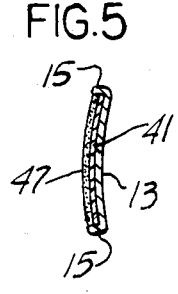
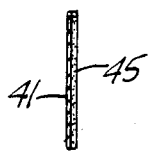
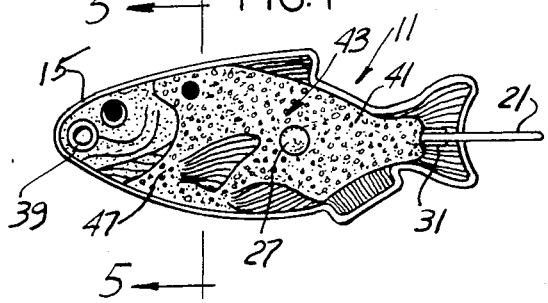
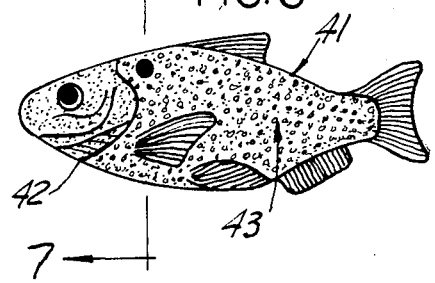
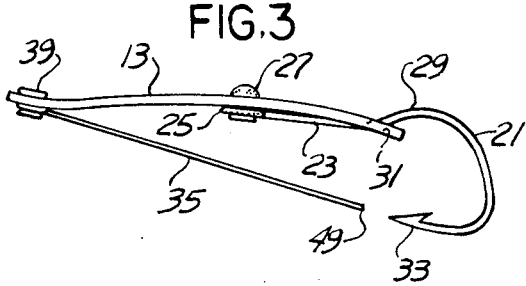
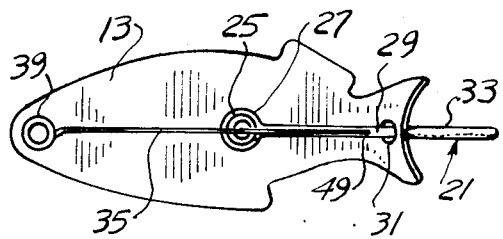
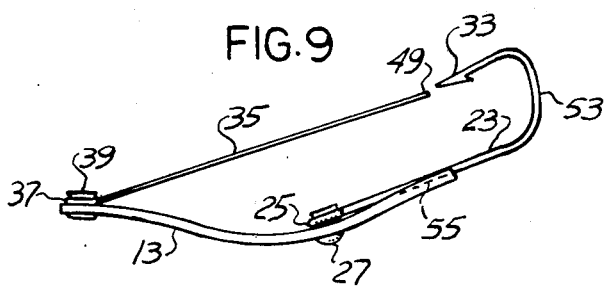
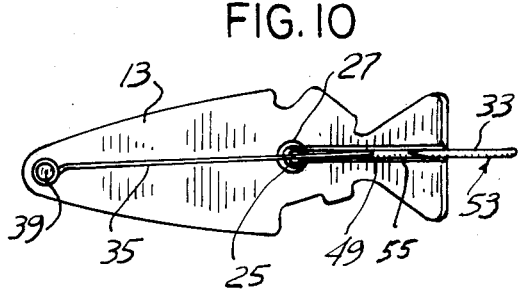
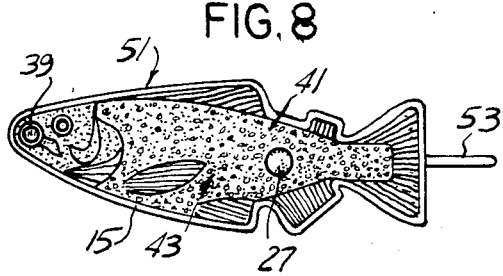

FISHING LURE

The present invention is directed to fishing lures and more particularly to a spoon type fishing lure having a barbed hook secured thereto.

BACKGROUND OF THE INVENTION

Heretofore spoon type lures frequently have concave-convex surfaces normally lying in a first plane, having secured thereto an elongated barbed hook lying in a plane at right angles to the first plane.

Heretofore in fishing lures of this type one difficulty has been that the hook becomes disassembled from the lure body or misaligned therewith or broken off due to the limited anchorage of the hook with respect to the lure body.

Heretofore fishing lures have the problem of trapping weeds upon their barbed portions tending to obscure and abstruct the lure as an attraction to fish, requiring cleaning and removal from time to time of such weeds, or other vegetation.

Heretofore spoon type lures have been provided with ornamentation on one side thereof with the other side being shiny and light reflective, with the ornamentation thereon providing additional attraction to a fish. Often through continued use the design upon the lure body becomes damaged or scratched to the extent that the lure is ineffective for attracting fish.

SUMMARY OF THE INVENTION

An important feature of the present invention is to provide an improved spoon type fishing lure which includes a lure body of a fish shape having front and rear surfaces, front and rear apertures, and an intermediate aperture, together with means for more effectively anchoring a hook to the lure body.

As an important feature, a fishing hook is arranged in a plane at right angles to the plane of the lure body centrally thereof, bears against the rear surface of the body and is suitably secured thereto, and intermediate its ends extends snugly through an aperture in the body and terminates in a reverse turned barb spaced from the said surface.

As a further feature, the fish hook includes an elongated shank having an eyelet at one end which registers with the intermediate aperture in the lure body and is secured thereto by a rivet. Portions of the shank snugly bear against said surface with an intermediate portion of the shank being bent on an angle so as to snugly extend through an aperture in the lure body, at its rear end, and terminate in a reverse turned barb spaced from said surface providing a double anchorage of the hook to the lure body.

It is an important feature to provide a spoon type lure which is of a weedless construction and includes a weed deflector bar at its forward end secured to the forward end of the lure body, such as by a rivet extending through an eyelet at the forward end of the deflector bar and through and secured to the lure body. The opposite end of the deflector bar is aligned with the hook barb and spaced therefrom.

A further feature includes upon the lure body upon its front surface, a continuous peripheral flange, and nested within said flange is a design imprinted strip of paper or other material having a natural form appearance such as of a fish, for example, and wherein the paper strip has a shape corresponding to the lure body and is snugly positioned within the peripheral flange and adhered to the lure body by an adhesive.

As a further feature a paper strip with an imprinted design has applied to its rear surface, a layer of pressure sensitive or other adhesive. The design strip is applied to the front surface of the lure body within the peripheral flange and is retained thereon.

Another feature includes the application over the strip with the fish indicia thereon or imprint design of a protective layer of a suitable epoxy resin or plastic material, such as polystyrene, which overlies the imprinted strip and extends to the peripheral flange.

As a further feature, a modified lure employs upon the rear surface of the body, a hook lying in a plane at right angles to the body. The shank bears against the rear surface of the body and at one end is anchored to an intermediate portion of the body along its length, such as by a rivet, and wherein the shank extends rearwardly and is retainingly nested within an undercut elongated groove within the lure body, and wherein the shank terminates in a reverse curved barb spaced from the rear surface of the body.

These and other features and objects will be seen from the following specification and claims in conjunction with the appended drawing.

THE DRAWING

FIG. 1 is a side elevational view of the present spoon type fishing lure.

FIG. 2 is a top plan view thereof.

FIG. 3 is a bottom plan view thereof.

FIG. 4 is a rear elevational view thereof.

FIG. 5 is a section taken in the direction of arrows 5—5 of FIG. 1.

FIG. 6 is a perspective view of an imprinted strip adhered to one surface of the lure body, as in FIG. 1.

FIG. 7 is a section taken in the direction of arrow 7—7 of FIG. 6.

FIG. 8 is a side elevational view of a modified spoon type fishing lure.

FIG. 9 is a plan view thereof.

FIG. 10 is a rear elevational view thereof.

It will be understood that the above drawing illustrates merely preferred embodiments of the invention and that other embodiments are contemplated within the scope of the claims hereafter set forth.

DETAILED DESCRIPTION OF AN EMBODIMENT OF THE INVENTION

Referring to the drawing, FIGS. 1 through 7, a weedless spoon type fishing lure is generally indicated at 11, FIG. 1, having a shape or outline similar to a small fish, a minnow or other natural form which might be used as a suitable lure. Said lure includes a body 13 of metal, such as aluminum, though not limited thereto, which has a front surface having an ornamentation or design imprint 43 thereon and a plain rear surface, which is shiny and light reflective to attract fish. Said body which may be convex-concave lies in a first plane.

Upon the body 13 and around its perimeter there is provided a continuous peripheral flange 15 adjacent its front surface. Formed within the body at the forward end thereof is an aperture 17, intermediate aperture 19, and adjacent its other end an aperture 31.

Fish hook 21 is arranged in a plane at right angles to the plane of the lure body centrally thereof and is secured thereto. The hook includes an elongated shank 23 having upon one end eyelet 25 secured to the inner surface of the lure body 13 by rivet 27. Said rivet extends through said eyelet, through aperture 19 and is secured to said body.

The shank of the hook has an angular portion 29 which snugly extends through aperture 31, FIG. 1, at the rear end portion of body 13 and terminates in the reverse turned forwardly extending barb 33 which is spaced from the rear surface of the lure body adjacent its trailing end.

While the rivet 27 has been shown for effectively anchoring one end of hook 21 through the corresponding eyelet 25, it is contemplated that the corresponding end of the hook could be otherwise secured to the body as by welding or brazing or the like.

It is the secondary retaining of the shank portion 29 snugly extending through aperture 31 of the body which firmly anchors the hook 21 to prevent its bending or disconnect from the lure body.

When the present lure is employed as a weedless fishing lure, there is applied to the rear surface thereof the weed deflector bar 35 at its forward end suitably secured to the leading end of the lure body.

In the illustrative embodiment, there is an eyelet 37 upon the deflector bar through which extends a hollow rivet 39. Said rivet extends through the corresponding forward aperture 17 in the lure body and is suitably secured thereto. Since, rivet 39 is hollow, it also serves as the conventional means of attaching a leader or fishing line thereto.

The trailing end 49 of the weed deflector bar is aligned with and longitudinally spaced forwardly of barb 33, FIG. 3. The deflector bar has limited flexibility.

The lure body has a front surface, FIG. 1, and a rear surface which is plain in FIG. 4.

A strip of paper 41 or other suitable material, FIG. 6, has been peripherally die cut to a shape corresponding to the shape of body 13, such as a small fish, for illustration, though not limited thereto. Strip 41 is peripherally die cut as at 42 and has imprinted thereon a small fish or minnow design or imprint 43.

It is contemplated as equivalent that the imprinted design 43 may not necessarily be a fish but could be the image of some other form of lure such as a crayfish, or shrimp or other natural form. The paper strip 41 with the design imprint 43 thereon has upon its rear surface a layer of pressure sensitive adhesive 45, FIG. 7. Any other form of adhesive may be employed.

Paper strip 41 or other strip of material with the design imprint 43 thereon is applied to the front surface of the lure body, FIG. 1 and is positioned so as to extend to the corresponding peripheral flange 15 on the lure body.

The peripheral flange is of just sufficient height, though shown exaggerated in FIG. 5, so as to receive paper strip 41 with its pressure sensitive adhesive layer 45, and thereover applied thereto a layer of a hardened epoxy resin or other plastic material, which may be of Polyurethane, for example. Layer 47 is a protective layer of plastic or other transparent material which overlies the paper strip and its design imprint 43, and extends to the peripheral flange 15 and is contained therein.

This is particularly advantageous during initial pouring of the liquid protective material 47 whether it be an epoxy resin or other plastic material until it dries or congeals.

The primary purpose of the epoxy resin or other protective layer 47 is to protect the design imprint 43 upon strip 41 against damage or scratching. The illustration in FIG. 5 as to the dimension of the flange is exaggerated to a small extent for clarity since the thickness of the protective layer need not be more than one or two mills.

MODIFICATION

A modified spoon type fishing lure is shown in FIGS. 8, 9 and 10. Much of the parts thereof are the same as above described with respect to FIGS. 1 through 7 and therefore those parts are not further described in detail.

The modified fishing lure 51, FIG. 8 primarily differs from fishing lure 11 of FIG. 1 in the method and structure by which the hook 53 is secured to the lure body. In this case as with hook 21, FIG. 3, hook includes an eyelet at one end of its shank, and its barb 33 lies in a plane at right angles to the plane of the lure body 13, FIG. 10. The shank 23 terminates in an eyelet 25 secured in position by a similar rivet 27 upon the interior surface of the lure body. The shank 23 retainingly extends along and is tightly constrained within a groove of U or V-shape at 55 which extends from the rivet 27 towards one end of the lure body. The modified hook 53 is anchored by the rivet 27 and by the channel 55 or groove in the rear surface of the lure body, FIGS. 9 and 10. In other respects the construction of the weedless fishing lure is the same as above described with respect to FIGS. 1 through 7.

Having described my invention, reference should now be had to the following claims:

I claim:

1. A spoon type fishing lure comprising an elongated body of fish shape having front and rear surfaces, said body lying substantially within a first plane;
   a barbed hook connected to the body;
   a peripheral flange extending around said body and forwardly of said front surface;
   a paper strip of a shape corresponding to said body having upon one surface a natural design imprint;
   a layer of adhesive upon its other surface;
   the strip being mounted upon the said front surface within and engaging said peripheral flange with said adhesive layer snugly engaging said body;
   and a hardened protective layer of a plastic material overlying said strip and in registry with and filling the space within said peripheral flange.

2. A spoon type fishing lure comprising an elongated body of fish shape having front and rear surfaces and an aperture at one end with said body lying within a first plane;
   a barbed hook in a plane at right angles to said first plane, including a shank bearing against said rear surface at one end secured to said body;
   there being a central longitudinal groove in said rear surface extending toward one end thereof;
   said shank extending along and retainingly positioned within said groove against angular displacement;
   said shank terminating in a reverse turned barb spaced from said rear surface;
   a peripheral flange extending around said body and forwardly of said front surface;
   a paper strip of a shape corresponding to said body having upon one surface a design imprint, and a layer of pressure sensitive adhesive upon its other surface;
   the strip being mounted upon said front surface within and engaging said peripheral flange with said adhesive layer snugly engaging said body;
   and a hardened protective layer of a plastic material overlying said strip, in registry with and filling the space within said peripheral flange and enclosing said design imprint.

* * * * *